United States Patent Office 2,822,198
Patented Feb. 4, 1958

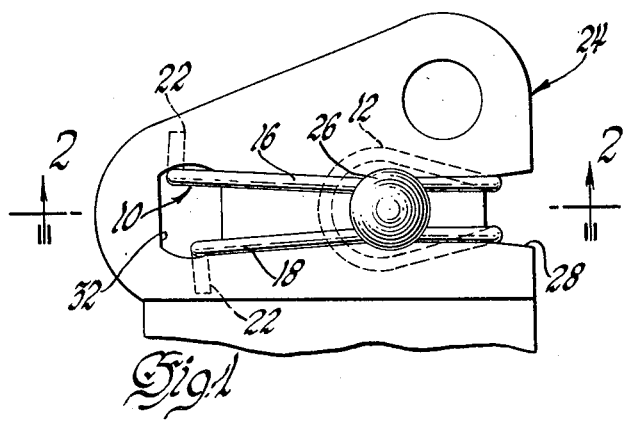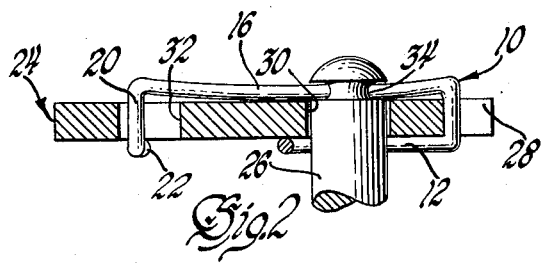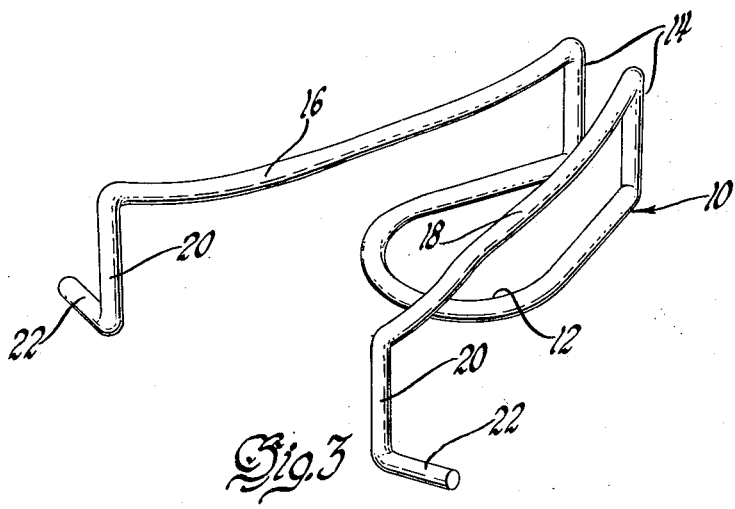
INVENTOR.
Bewley D. Priestman
BY
ATTORNEY.

2,822,198

FASTENER MEANS

Bewley D. Priestman, Grosse Pointe Woods, Mich., assignor to General Motors Corporation, Detroit, Mich., a corporation of Delaware Application February 20, 1956, Serial No. 566,476

2 Claims. (Cl. 287—20.5)

This invention relates to fasteners generally and more particularly to means for retaining the end of a rod or shaft while permitting rotation thereof.

Numerous means have been devised for retaining a rod or shaft from being axially movable and still permitting its rotation. Such means include cotter and other pin means and various spring clip fasteners. In each instance it is desirable to provide both an inexpensive retainer means and one which is readily assembled with the parts it secures together.

It is now proposed to provide a spring clip fastener for securing a rod or shaft to the end of an arm member and one which does not interfere with the ability of the rod or shaft to be rotated but does prohibit its axial movement. The fastener means proposed is inexpensive to manufacture and is easily installed with the members with which it is used.

In the drawings:

Figure 1 is a top view of the proposed fastener means as assembled for use with a rod and receiving arm member.

Figure 2 is a cross-sectional view of the fastener means and parts it secures together as shown in Figure 1 taken in the plane of line 2—2 of such figure and looking in the direction of the arrows thereon.

Figure 3 is a perspective view of the proposed spring clip fastener.

The spring clip fastener shown in the drawings is preferably made from a spring wire and includes a member 10 having an open loop 12 formed intermediate the ends thereof. The free ends of the wire member 10 are first bent transversely with respect to the plane of the loop 12, as at 14, and then forwardly over the loop to provide spring arms 16 and 18. Arms 16 and 18 extend divergently apart and are curved towards the loop 12, as best shown in Figure 2, though the clip is shown as installed. The remaining free ends of the wire are next bent transversely towards the plane of loop 12, as at 20, and then in opposite directions, substantially in the plane of the open loop, to form hook leg portions 22.

The spring clip fastener disclosed is preferably used with a lever arm member 24, such as is shown, to retain a rod or shaft 26 relative thereto.

The lever arm member 24 has one edge slotted, as at 28, and is formed to include spaced apertures 30 and 32. The rod 26 has an annular groove 34 formed about one end thereof and is received through aperture 30. The spring clip member 10 is readily assembled with the arm member 24 and rod 26 where only one side or edge of the lever arm is accessible as will be described.

The wire member 10 is received within the slotted edge 28 of member 24 with the loop 12 disposed about rod 26, as extended through aperture 30, and on one side of member 24. The spring arms 16 and 18 of the clip are disposed on the other side of member 24 and as pressed together are received within the annular groove 34 of rod 26. The hook leg portions 22 of spring arms 16 and 18, as held together, are inserted through apertures 32 and are released to engage the edges of opening 32 as shown in Figure 2. The curvature of the spring arms 16 and 18 causes the intermediate portion of the arms to engage member 24, biasing the hook leg portions 22 in engagement with the underside of member 24 while the restrained tendency of arms 16 and 18 to diverge outwardly from each other, due to the engagement of hook leg portions 22 with the edges of apertures 30 and of the reversely bent neck portion 14 within the slotted edge 28 of member 24, retains the arms in biased engagement within the grooved end of rod 26. The rod is thereby held against axial movement relative to lever arm member 24 but is permitted rotational movement as desired.

The claims:

1. A continuous wire spring clip retainer formed to provide a centrally disposed loop having coplanar straight convergent legs and adapted to freely receive a rotatable element therethrough, each of said convergent legs being reversely bent to define parallel first spring force transmitting sections and divergent legs, said divergent legs each being disposed in a plane containing one of said convergent legs and askew to the other of said convergent legs and provided with hooked ends defining second spring force transmitting sections, each of said divergent legs further having a center section adapted to engage and axially retain said rotatable member.

2. The retainer of claim 1, said divergent leg center sections being curved to present convex sides adjacent said respective convergent legs.

References Cited in the file of this patent

UNITED STATES PATENTS

| 1,065,758 | Woodwell | June 24, 1913 |
| 1,231,869 | Farley | July 3, 1917 |
| 2,136,981 | Place | Nov. 15, 1938 |
| 2,586,940 | Graham | Feb. 26, 1952 |
| 2,714,972 | Potts | Aug. 9, 1955 |